United States Patent [19]

Charlton et al.

[11] Patent Number: 4,620,359

[45] Date of Patent: Nov. 4, 1986

[54] APPARATUS FOR MANUFACTURING RIGID COMPUTER MEMORY DISC SUBSTRATES

[75] Inventors: Richard J. Charlton, S. Laguna; Leland R. Krueger, Costa Mesa; Richard M. Noling, Irvine; Jimmy G. Saunders, El Toro; Richard J. Elliott, Costa Mesa, all of Calif.

[73] Assignee: Charlton Associates, Irvine, Calif.

[21] Appl. No.: 551,254

[22] Filed: Nov. 14, 1983

[51] Int. Cl.⁴ .................................................. B23P 13/04
[52] U.S. Cl. ..................................... 29/557; 29/27 R; 29/33 R; 29/33 J; 29/38 B; 29/56.5; 29/703; 29/705; 29/709; 29/792; 29/822; 29/407; 198/803.13; 414/223; 414/744 R
[58] Field of Search ................... 29/27 R, 33 R, 33 J, 29/38 B, 56.5, 527.4, 557, 558, 563, 703, 705, 709, 712, 792, 822, DIG. 7, DIG. 26, DIG. 28, 407; 198/617, 803; 360/135; 414/222, 223, 744 R

[56] References Cited

U.S. PATENT DOCUMENTS

| | | | |
|---|---|---|---|
| 4,152,566 | 5/1979 | Mägerle | 29/792 X |
| 4,202,228 | 5/1980 | Göransson | 29/38 B X |
| 4,270,649 | 6/1981 | Mayer | 29/407 X |
| 4,520,595 | 6/1985 | Diener | 29/563 X |

Primary Examiner—Howard N. Goldberg
Assistant Examiner—R. S. Wallace
Attorney, Agent, or Firm—Spensley Horn Jubas & Lubitz

[57] ABSTRACT

A method and an apparatus for manufacturing rigid computer memory disc substrates is disclosed wherein the apparatus comprises a circular base plate, the base plate being mounted horizontally for rotation about a vertical axis; a plurality of spindles rotatably mounted on motors mounted on the base plate, the spindles extending radially outwardly from the base plate, in equally spaced relationship therearound, the outwardly extending end of each spindle including a fastening means for mounting a rigid disc to be processed thereon; a plurality of work stations spaced around the circular base plate for performing work operations on the discs; and a motor for rotating the base plate so as to convey each of the discs consecutively to each of the work stations.

8 Claims, 3 Drawing Figures

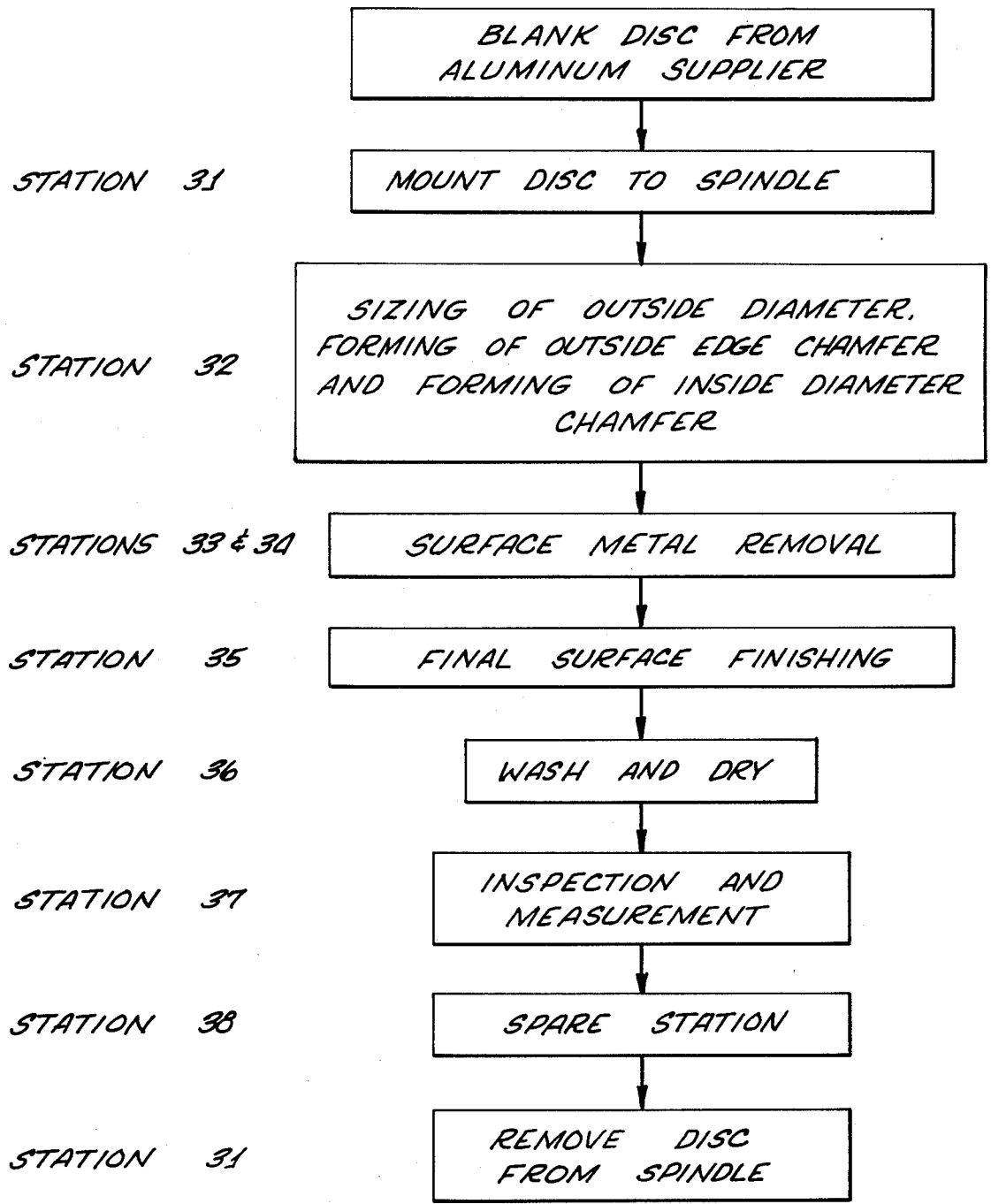

APPARATUS FOR MANUFACTURING RIGID COMPUTER MEMORY DISC SUBSTRATES

BACKGROUND OF THE INVENTION

1. Field of the Invention

The present invention relates to an apparatus for manufacturing rigid computer memory disc substrates and, more particularly, to a manufacturing apparatus that integrates a multitude of separate processes into a single process to manufacture rigid computer memory disc substrates.

2. Description of the Prior Art

The present invention relates to the manufacture of rigid computer memory disc substrates of the type which are used with a memory apparatus of a computer for storing data thereon. These substrates are typically made of an aluminum alloy, have an inner diameter of 1.576 inch, an outer diameter of 5.118 inch, and a thickness of 0.075 inch. The opposed surfaces of the substrates are coated with a magnetic coating for memory use.

Present methods used to manufacture rigid substrates for computer memory use typically involve several separate pieces of machinery in a serial, step-by-step process, each piece of machinery having its own operator. Thus, when a disc blank is initially received from an aluminum supplier, it is placed on a first machine (a lathe), for the purpose of sizing the outside and inside diameters, including adding edge chamfers. The aluminum disc is then placed on another machine (also typically a lathe), where both sides of the disc are faced. It is then common to use an oven for thermoflattening before the blanked disc is moved to polishing machines for final finishing. An array of measurement equipment is then used for final testing before the completed disc substrate is ready for magnetic coating.

This method of manufacturing rigid computer memory disc substrates has a number of disadvantages. First of all, the discs are stacked and unstacked at each process step by the equipment operator, thereby running the risk of handling damage to the discs. Periodically, discs are taken from the process flow and measured by quality control personnel, usually in a separate area, to assure that the discs are meeting specification requirements. If they are not within required tolerances, corrective action must be taken by the operator or by a maintenance technician. The operator of a specific machine often will also make some of the measurements on a sampling basis. Where the measurements are made periodically by the operator or the quality control personnel, there remains the risk of an unknown number of defective parts, caused by drift of machine adjustments, proceeding down the process flow before the machine maladjustment is discovered.

SUMMARY OF THE INVENTION

The present invention reduces and, in some cases, eliminates the disadvantages discussed above by the provision of a single, unitary apparatus for manufacturing rigid computer memory disc substrates. In place of several separate pieces of equipment as described above, each with its own operator and measuring equipment used by the operator, with discs being stacked and unstacked and transported between stations, there is provided a single machine that holds a plurality of discs. The machine is designed to move the discs through a plurality of stations automatically, in a given sequence, thereby performing all of the required operations on the disc, starting with a blanked ring from an aluminum supplier and ending with a finished substrate. With the present apparatus, measurements on the discs can be performed automatically by the equipment at each of the various positions as the discs progress through a sequence of steps in manufacture. Thus, if a machine becomes misadjusted, corrective action can be taken immediately, eliminating the risk of an unknown number of defective parts proceeding down the process flow.

With the present machine, the disc exits the manufacturing process as a finished disc substrate, ready to go into wet processing for the depositing of a magnetic coating. Such wet processes are well known to those skilled in the art and are not part of the present invention. Substrates made by this invention could just as easily be coated by conventional magnetic oxide or by plating or depositing processes or could even be used in applications entirely different than magnetic coating or memory use.

The present apparatus is highly susceptible to computerization, with the various movements and operations of the machine initiated and synchronized by program control in a computer. Computer control of processing machines is well known to those skilled in the art. A typical computer would send out actuating signals to the various devices on the equipment which operate on the discs and also receive input signals from a plurality of sensors. These sensors can tell the disc location at any particular instant, the position of the various devices, the quality of the disc itself, if machine fluids are flowing or not, present or not, and their temperature and other physical properties. Information gathered from such sensors may be used to make adjustments automatically in the various devices to keep the discs within specified tolerances. In addition, the information stored in the computer may be collected and summarized for statistical evaluation over a long period of time, thereby showing trends and other statistical quality control functions. This long term information may also be used to predict metal cutting tool wear, when replacement is required, to predict polishing wheel replacement time and other similar types of useful information.

Briefly, the present apparatus for manufacturing rigid computer memory disc substrates comprises a circular base plate; means for mounting the base plate horizontally for rotation about a vertical axis; a plurality of spindles rotatably mounted on the base plate and extending radially outwardly therefrom, in equally spaced relationship therearound, the outwardly extending end of each spindle including means for mounting a rigid disc to be processed thereon; a motor for rotating each of the spindles; a plurality of work stations spaced around the circular base plate for performing work operations on the discs; and a motor for rotating the base plate so as to convey each of the discs consecutively to each of the work stations.

OBJECTS, FEATURES AND ADVANTAGES

It is therefore an object of the present invention to reduce or eliminate the disadvantages encountered with previous methods used for manufacturing rigid computer memory disc substrates. It is a feature of the present invention to reduce or eliminate these disadvantages by providing a single unitary apparatus for holding a plurality of discs and moving such discs through a plurality of stations automatically, in a given sequence, thereby performing all of the required operations on a blank ring to make it a finished substrate. An advantage to be derived is that all of the steps in the manufacture of rigid computer memory disc substrates can be performed by a single operator. A further advantage is the elimination of multiple pieces of equipment. A still further advantage is the elimination of stacking and unstacking of discs at each of multiple machines. Another advantage is eliminating the risk of damaging discs due to handling. Still another advantage is that measurements can be taken at each step in the process flow. Another advantage is the elimination of the risk of an unknown number of defective parts proceeding down the process flow.

Still another advantage is a machine ideally suited to computer control. Another advantage is an ability to collect data for statistical analysis and control. Still another advantage is the ability to feed back measurements made on the discs to the various work stations and to make corrective adjustments automatically. A further advantage is flexibility and ease in adjusting parameters and operating settings, both incrementally and/or continuously during disc processing.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 3 is a process flow diagram showing the steps performed at the various work stations.

DESCRIPTION OF THE PREFERRED EMBODIMENT

Figure 1:
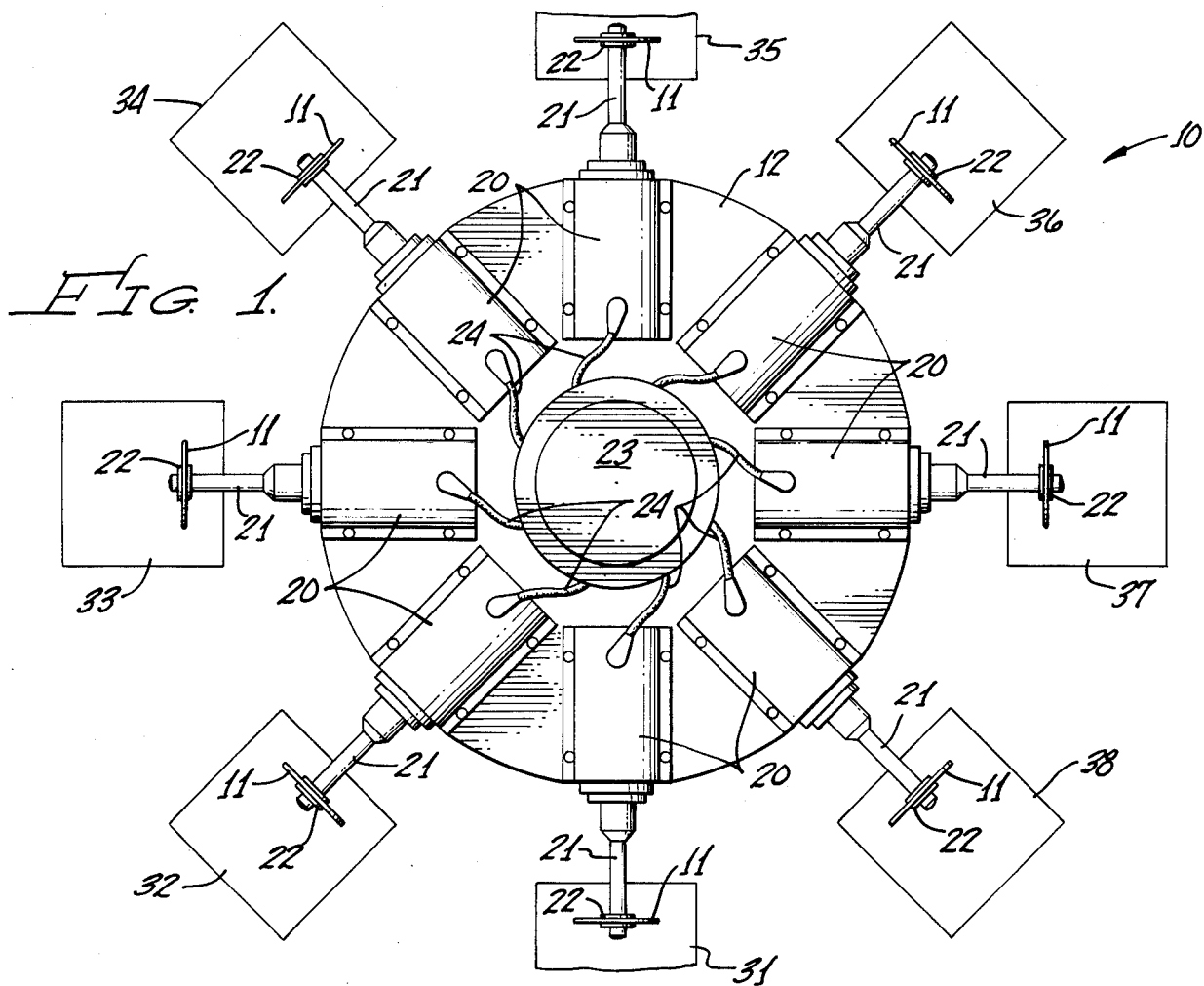
FIG. 1 is a top plan view of the present apparatus for manufacturing rigid computer memory disc substrates.
Figure 2:
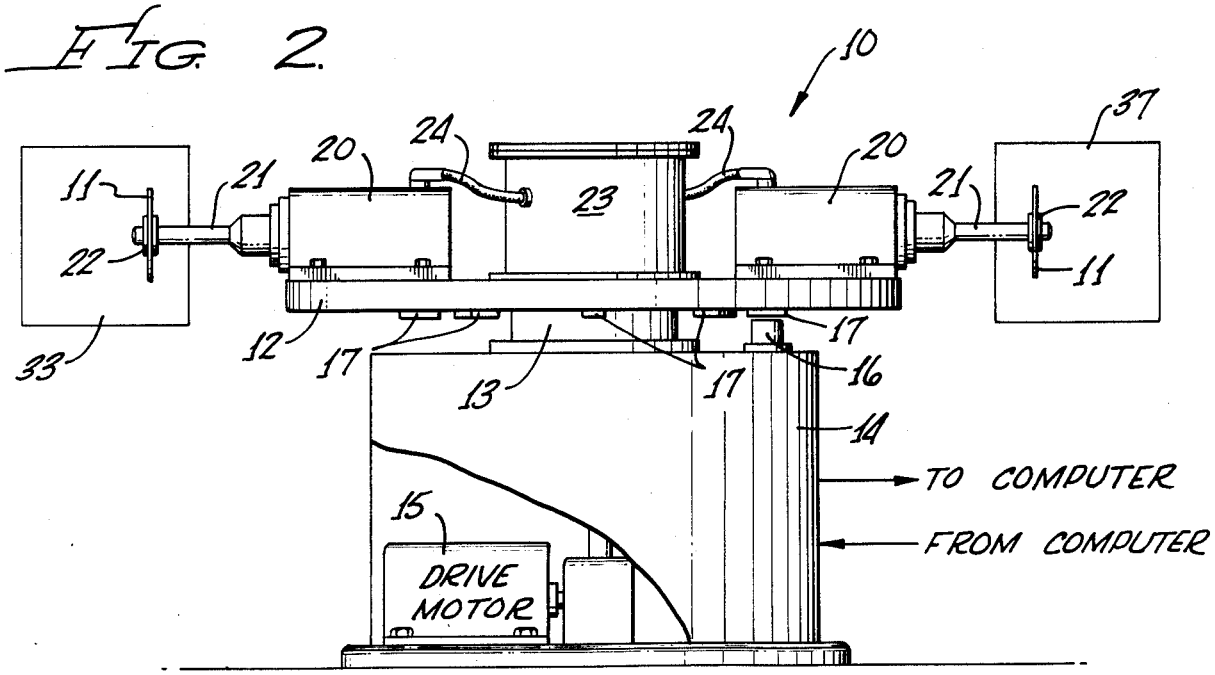
FIG. 2 is a side elevation view thereof.

Referring now to the drawings and, more particularly, to FIGS. 1 and 2 thereof, there is shown an apparatus, a machine, generally designated 10, for producing a completed rigid computer memory disc substrate starting from a blanked ring provided by an aluminum supplier. The disc 11 that is processed into a finished substrate for computer memories in this particular instance is of an aluminum alloy.

Machine 10 includes a circular base plate 12 which lies in a horizontal plane. Base plate 12 is mounted for rotation about a vertical axis on a shaft 13. Shaft 13 extends vertically upwardly from a motorized indexing table assembly 14 having incorporated therein a drive motor 15. Assembly 14 receives command signals from a computer (not shown) for activating drive motor 15 to rotate shaft 13 and base plate 12 therewith. As will be described more fully hereinafter, base plate 12 rotates in increments, here 45° increments, moving a given disc 11 around in a circular path to a succession of positions, here eight. A position sensor 16 is mounted on assembly 14 to detect coded position indicators 17 mounted on the lower surface of base plate 12. When position sensor 16 detects a given position indicator 17, it generates a signal which can be transmitted to the computer. Thus, position sensor 16 can provide information as to the particular orientation of base plate 12 and the location of each disc 11 mounted thereon.

Mounted on the upper surface of base plate 12, at 45° intervals therearound, are eight motors 20. Each motor 20 supports for rotation one end of a spindle 21 so that spindles 21 are rotatably mounted on base plate 12 and extend radially outwardly therefrom, in equally spaced relationship therearound, the outwardly extending end of each spindle 21 including a suitable fastening means 22 for mounting a disc 11 to be processed thereon. Electrical power is brought to motors 20 by a slip ring assembly 23 mounted centrally on base plate 12 and deriving its power from table assembly 14. A plurality of electrical cables 24 extend outwardly from assembly 23 for connection to motors 20.

Surrounding machine 10 are a plurality of work stations, generally designated 31-38. At each of work stations 31-38, a different operation occurs on disc 11. These operations may occur to both sides of disc 11 or on the edge and may or may not occur simultaneously. While the apparatus at the particular work station is not per se a portion of the present invention, machine 10 is designed so that discs 11 protrude radially outwardly from base plate 12 and each spindle 21 terminates in a slender portion which permits the design of apparatus at a particular position to encompass both sides of each disc 11, if desired. This is in direct contrast to present methods of substrate preparation where some of the operations can only be done on one side at a time. As an example, in lathe-facing of a disc, one side is typically mounted to the lathe chuck, usually a vacuum chuck, and machined. The disc is then turned over by hand by the operator, remounted to the chuck, and then the opposite side machined. The need to turn the disc over is eliminated with the present invention because once disc 11 is mounted on spindle 21, it remains mounted until the end of the entire sequence of operations.

The preferred sequence of operations, according to the present embodiment of the invention, is shown in block diagram form in FIG. 3. That is, after a blank disc 11 is received from an aluminum supplier, it is mounted to a spindle 21 at work station 31. The remaining operations are performed on disc 11 while it is mounted on motorized spindle 21 at each of the subsequent work stations 32-38, in sequence, by devices (not shown) disposed at each position around base plate 12. Thus, at station 32, apparatus can be provided for sizing of the outside diameter, forming of the outside edge chamfer and forming of the inside diameter chamfer. The necessity for performing each of these steps is well known to those skilled in the art.

The apparatus at stations 33, 34 and 35 would typically be identical and include grinding/polishing pads for metal removal and metal surface finishing. The provision of two opposing pads above and two opposing pads below the disc centerline permits surface metal removal and final surface polishing of both sides of disc 11 simultaneously. Rough surface metal removal would typically be performed at stations 33 and 34 and final surface finishing performed at station 35.

The operation performed at station 36 is a wash and dry. A stream of pressurized, deionized water is sprayed over disc 11, followed by a blast of purified air.

Station 37 may be used for inspection and measurement. A plurality of transducers, both contacting and non-contacting type, may be mounted for sensing diameter, chamfer, chamfer radius, surface finish, and the like of disc 11.

After disc 11 passes station 37, it moves to station 38 which is presently a spare station providing machine 10 with expansion capability as circumstances require. Disc 11 then returns to station 31 where it is removed from spindle 21 as a completed substrate, except for sizing of the inner diameter, which is most conveniently performed by a separate machine after disc 11 has been removed from spindle 21. It can be seen that at each rotation of base plate 12, a disc 11 is removed and a new blank is mounted.

To those skilled in the art of computerized control systems, it will be apparent that a control system may be prepared for machine 10 in a straightforward manner. The computer would have a program written specifically for it to control the sequence of timing and energization of machine 10 and the equipment at stations 32-37, as well as to receive sensor signals and transducer inputs. Such a computer would be capable of performing mathematical and statistical operations and analysis on the sensor and transducer inputs, making adjustments in the process parameters as a result of sensor and transducer inputs, which may or may not have had mathematical or statistical operations previously performed, providing messages to operators or maintenance personnel based on sensor and transducer inputs, giving information about possible malfunctions and required maintenance needs, and transmitting information as to the status of all equipment.

It can therefore be seen that the present invention reduces and, in some cases, eliminates the disadvantages encountered in the prior art by providing a single, unitary apparatus 10 for manufacturing rigid computer memory disc substrates 11. In place of several separate pieces of equipment, each with its own operator and measurement equipment used by the operator, with discs being stacked and unstacked and transported between stations, there is provided a single machine 10 that holds a plurality of discs 11. Machine 10 is designed to move discs 11 through a plurality of stations 31-38 automatically, in a given sequence, thereby performing all of the required operations on disc 11, starting with a blanked ring from an aluminum supplier and ending with a finished substrate. With machine 10, measurements on discs 11 can be performed automatically by the equipment at each of the various positions as the discs progress through a sequence of steps in manufacture. Thus, if machine 10 becomes misadjusted, corrective action can be taken immediately, eliminating the risk of an unknown number of defective parts proceeding down the process flow.

While the invention has been described with respect to the preferred physical embodiment constructed in accordance therewith, it will be apparent to those skilled in the art that various modifications and improvements may be made without departing from the scope and spirit of the invention. Accordingly, it is understood that the invention is not to be limited by the specific illustrative embodiment, but only by the scope of the appended claims.

We claim:

1. A method of manufacturing rigid computer memory disc substrates comprising the steps of:
    providing a circular base plate;
    mounting said base plate horizontally for rotation about a vertical axis;
    rotatably mounting a plurality of spindles on said base plate, said spindles extending radially outwardly therefrom, in equally spaced relationship therearound;
    mounting a rigid disc on the outwardly extending end of each of said spindles;
    rotating each of said spindles;
    providing a plurality of work stations around said circular base plate for performing work operations on said discs; and
    rotating said base plate so as to convey each of said discs consecutively to each of said work stations; and
    automatically sensing and measuring at one work station the results of the operations of prior work stations on each of said discs and automatically making adjustments to said prior work stations as a result of said measurements made on said discs to maintain said prior work stations within predetermined tolerances for subsequent discs.

2. A method according to claim 1, further comprising:
    mounting discs on and removing discs from said spindles at a first one of said work stations.

3. A method according to claim 2, further comprising:
    sizing the outside diameter of each disc at one of said work stations.

4. A method according to claim 2, further comprising:
    forming an outside edge chamfer on each disc at one of said work stations.

5. A method according to claim 2, further comprising:
    forming an inside diameter chamfer on each disc at one of said work stations.

6. A method according to claim 2, further comprising:
    removing surface metal at at least one of said work stations.

7. A method according to claim 2, further comprising:
    surface finishing at at least one of said work stations.

8. A method according to claim 2, further comprising:
    washing and drying said discs at one of said work stations.

* * * * *